(12) United States Patent
Hartwich et al.

(10) Patent No.: US 7,108,319 B2
(45) Date of Patent: Sep. 19, 2006

(54) AIR CONDITIONED CUSHION PART FOR A VEHICLE SEAT

(75) Inventors: Dirk Hartwich, Wuppertal (DE); Gerhard Schmale, Hückeswagen (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 10/485,016

(22) PCT Filed: Jul. 27, 2002

(86) PCT No.: PCT/EP02/08408

§ 371 (c)(1),
(2), (4) Date: Jan. 28, 2004

(87) PCT Pub. No.: WO03/011633

PCT Pub. Date: Feb. 13, 2003

(65) Prior Publication Data

US 2004/0189061 A1 Sep. 30, 2004

(30) Foreign Application Priority Data

Jul. 28, 2001 (DE) .......................... 201 12 473 U (51) Int. Cl.
*A47C 7/74* (2006.01)
(52) U.S. Cl. .................. 297/180.1; 297/180.16
(58) Field of Classification Search ............. 297/180.1, 297/180.12, 180.13, 180.14, 180.16
See application file for complete search history.

(56) References Cited

U.S. PATENT DOCUMENTS

| | | | |
|---|---|---|---|
| 374,424 A | 12/1887 | Ober | |
| 390,154 A | 9/1888 | Beach | |
| 1,370,832 A | 3/1921 | Mollberg | |
| 1,439,681 A | 12/1922 | Alkire et al. | |
| 1,475,912 A | 11/1923 | Williams | |
| 1,514,329 A | 11/1924 | Metcalf | |
| 1,537,460 A | 5/1925 | Campbell et al. | |
| 1,593,066 A | 7/1926 | Gaston | |
| 1,664,636 A | 4/1928 | Mayer | |
| 1,811,829 A | 6/1931 | Folberth et al. | |
| 1,837,515 A | 12/1931 | Bachrach | |
| 1,936,960 A | 11/1933 | Bowman | |
| 2,012,042 A * | 8/1935 | Hugo et al. | ................. 267/145 |
| 2,022,959 A | 12/1935 | Gordon | |

(Continued)

FOREIGN PATENT DOCUMENTS

DE 2 136 947 2/1973

(Continued)

*Primary Examiner*—Rodney B. White
(74) *Attorney, Agent, or Firm*—Foley & Lardner LLP (57) ABSTRACT

The invention relates to an upholstered element (1) for a lower seat part (2) and/or a backrest (4) of an air-conditioned motor-vehicle seat (6), comprising an elastic upholstered air-permeable base part (8) and an air-permeable air-conditioning layer (10) which is disposed on the surface of the base part (8). The air-conditioning layer (10) consists of at least two partial layers (14, 16), i.e. a lower layer (14) which is oriented towards the base part (8) and an upper layer (16) which is disposed on top of the lower layer (14). The upper layer (16) is made of a material which absorbs moisture. Preferably, an intermediate layer (22) made of an air-permeable material is disposed between the base part (8) and the lower layer (14). The lower layer (14) is relatively softer and the intermediate layer (22, 22*a*) is relatively harder, whereby the lower layer (14) and intermediate layer (22) are prevented from being pressed into holes (18) in the base part (8) when the seat is occupied.

29 Claims, 5 Drawing Sheets

U.S. PATENT DOCUMENTS

| | | |
|---|---|---|
| 2,103,553 A | 12/1937 | Reynolds |
| 2,141,271 A | 12/1938 | Gerlofson |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,722,266 A | 11/1955 | Kersten |
| 2,726,658 A | 12/1955 | Chessey |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 8/1961 | Trotmann et al. |
| 2,992,605 A | 8/1961 | Trotman et al. |
| 3,030,145 A | 4/1962 | Kottemann |
| 3,097,505 A | 7/1963 | Smith |
| 3,101,037 A | 8/1963 | Taylor |
| 3,101,660 A | 8/1963 | Taylor |
| 3,131,967 A | 5/1964 | Spaulding |
| 3,136,577 A | 6/1964 | Richard |
| 3,137,523 A | 6/1964 | Karner |
| 3,144,270 A * | 8/1964 | Bilancia ............... 297/180.16 |
| 3,298,046 A | 1/1967 | Clementi et al. |
| 3,381,999 A | 5/1968 | Steere, Jr. |
| 3,486,177 A | 12/1969 | Marshack |
| 3,506,308 A * | 4/1970 | Fenton ................. 297/452.47 |
| 3,529,310 A | 9/1970 | Olmo |
| 3,605,145 A | 9/1971 | Graebe |
| 3,628,829 A | 12/1971 | Heitig |
| 3,638,255 A * | 2/1972 | Sterrett ............... 297/180.1 X |
| 3,681,797 A | 8/1972 | Messner |
| 3,732,944 A | 5/1973 | Kendall |
| 3,736,022 A | 5/1973 | Radke |
| 3,757,366 A | 9/1973 | Sacher |
| 3,770,318 A * | 11/1973 | Fenton ................. 297/452.47 |
| 3,778,851 A | 12/1973 | Howorth |
| 3,948,246 A | 4/1976 | Jenkins |
| 3,974,532 A | 8/1976 | Ecchuya |
| 3,987,507 A | 10/1976 | Hall |
| 4,002,108 A | 1/1977 | Drori |
| 4,008,498 A | 2/1977 | Thomas |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,143,916 A | 3/1979 | Trotman et al. |
| 4,149,285 A | 4/1979 | Stanton |
| 4,175,297 A | 11/1979 | Robbins et al. |
| 4,391,009 A | 7/1983 | Schild et al. |
| 4,413,857 A | 11/1983 | Hayashi |
| 4,509,792 A | 4/1985 | Wang |
| 4,522,447 A | 6/1985 | Snyder et al. |
| 4,589,656 A | 5/1986 | Baldwin |
| 4,629,253 A | 12/1986 | Williams |
| 4,673,605 A | 6/1987 | Sias et al. |
| 4,685,727 A | 8/1987 | Cremer et al. |
| 4,686,724 A | 8/1987 | Bedford |
| 4,712,832 A | 12/1987 | Antolini et al. |
| 4,719,764 A | 1/1988 | Cook |
| 4,729,598 A | 3/1988 | Hess |
| 4,847,933 A | 7/1989 | Bedford |
| 4,852,934 A | 8/1989 | Yasuda et al. |
| 4,853,992 A | 8/1989 | Yu |
| 4,866,800 A | 9/1989 | Bedford |
| 4,923,248 A | 5/1990 | Feher |
| 4,946,220 A | 8/1990 | Wyon et al. |
| 4,980,940 A | 1/1991 | Isshiki |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,079,790 A | 1/1992 | Pouch |
| 5,102,189 A | 4/1992 | Saito et al. |
| 5,106,161 A | 4/1992 | Meiller |
| 5,138,851 A | 8/1992 | Mardikian |
| 5,160,517 A | 11/1992 | Hicks et al. |
| 5,163,737 A | 11/1992 | Navach et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,522,106 A | 6/1996 | Harrison et al. |
| 5,544,942 A | 8/1996 | Khac et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,386 A | 5/1997 | Lush |
| 5,626,387 A | 5/1997 | Yeh |
| 5,640,728 A | 6/1997 | Graebe |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,850,648 A | 12/1998 | Morson |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,068,332 A | 5/2000 | Faust et al. |
| 6,109,688 A | 8/2000 | Wurz et al. |
| 6,152,534 A | 11/2000 | Maeda et al. |
| 6,179,706 B1 | 1/2001 | Yoshinori et al. |
| 6,186,592 B1 | 2/2001 | Orizaris et al. |
| 6,189,966 B1 * | 2/2001 | Faust et al. ............ 297/180.14 |
| 6,196,627 B1 * | 3/2001 | Faust et al. ............ 297/180.14 |
| 6,206,465 B1 * | 3/2001 | Faust et al. ............ 297/180.14 |
| 6,224,150 B1 * | 5/2001 | Eksin et al. ............ 297/180.1 |
| 6,277,023 B1 | 8/2001 | Schwarz |
| 6,481,801 B1 | 11/2002 | Schmale |
| 6,511,125 B1 | 1/2003 | Gendron |
| 6,541,737 B1 * | 4/2003 | Eksin et al. ........ 297/180.12 X |
| 6,546,578 B1 | 4/2003 | Steinmeier |
| 6,578,910 B1 | 6/2003 | Andersson et al. |

| | | | | | | |
|---|---|---|---|---|---|---|
| 6,619,736 B1 | 9/2003 | Stowe et al. | DE | 3705756 A1 | 10/1988 | |
| 6,619,737 B1* | 9/2003 | Kunkel et al. ......... 297/180.14 | DE | 39 28 883 A1 | 3/1991 | |
| 6,626,488 B1* | 9/2003 | Pfahler .............. 297/180.12 X | DE | 4001207 | 7/1991 | |
| 6,629,724 B1 | 10/2003 | Ekern et al. | DE | 19607110 | 8/1997 | |
| 6,629,725 B1 | 10/2003 | Kunkel et al. | DE | 19736951 A1 | 3/1999 | |
| 6,676,207 B1 | 1/2004 | Rauh et al. | DE | 197 45 521 A1 | 4/1999 | |
| 6,786,541 B1 | 9/2004 | Haupt et al. | DE | 19810936 | 9/1999 | |
| 6,793,016 B1 | 9/2004 | Aoki et al. | DE | 198 51 979 A1 | 5/2000 | |
| 6,840,576 B1 | 1/2005 | Ekern et al. | DE | 19954978 C1 | 1/2001 | |
| 6,869,140 B1 | 3/2005 | White et al. | DE | 199 47 567 A1 | 4/2001 | |
| 6,928,829 B1 | 8/2005 | Kamiya et al. | DE | 10001314 A1 | 7/2001 | |
| 6,929,322 B1 | 8/2005 | Aoki et al. | DE | 200 02 540 U1 | 8/2001 | |
| 2001/0035669 A1 | 11/2001 | Andersson et al. | EP | 0345806 | 12/1989 | |
| 2002/0003362 A1* | 1/2002 | Kunkel et al. ......... 297/180.14 | EP | 0936105 A1 | 8/1999 | |
| 2002/0096915 A1 | 7/2002 | Haupt et al. | EP | 1075984 B1 | 2/2001 | |
| 2002/0096931 A1 | 7/2002 | White et al. | EP | 1 123 834 A1 | 8/2001 | |
| 2002/0140258 A1 | 10/2002 | Ekern et al. | EP | 1123 34 A1 | 8/2001 | |
| 2003/0039298 A1 | 2/2003 | Eriksson et al. | EP | 1086852 | 1/2004 | |
| 2003/0212160 A1 | 11/2003 | Brennan et al. | FR | 1266925 | 6/1961 | |
| 2003/0214160 A1 | 11/2003 | Brennan et al. | FR | 2630056 A1 | 10/1989 | |
| 2003/0230913 A1* | 12/2003 | Buss et al. ............. 297/180.14 | FR | 2686299 | 7/1993 | |
| 2004/0189061 A1 | 9/2004 | Hartwich et al. | GB | 2 076 648 | 12/1981 | |
| 2005/0066505 A1 | 3/2005 | Iggbal et al. | JP | 52 062560 | 5/1977 | |
| 2005/0070219 A1 | 3/2005 | Wollenhaupt et al. | JP | 01 172012 | 7/1989 | |
| 2005/0082885 A1 | 4/2005 | Thunissen et al. | JP | 08/028797 | 2/1996 | |
| 2005/0085968 A1 | 4/2005 | Panic | WO | WO 96/05475 A1 | 2/1996 | |
| 2005/0121966 A1 | 6/2005 | White et al. | WO | WO 99/50090 A1 | 10/1999 | |
| 2005/0161986 A1 | 7/2005 | Brennan et al. | WO | WO 01/05623 | 1/2001 | |
| 2005/0178755 A1 | 8/2005 | Ulbrich | WO | WO 02/06914 A1 | 1/2002 | |
| 2005/0243331 A1 | 11/2005 | Ishima et al. | WO | WO 03/011633 | 2/2003 | |
| | | | WO | WO 03/051666 | 6/2003 | |
| | FOREIGN PATENT DOCUMENTS | | WO | WO 04/089689 A1 | 10/2004 | |
| DE | 2136947 | * 2/1973 | WO | WO 05/73021 A2 | 8/2005 | |
| DE | 28 25 597 | 12/1978 | * cited by examiner | | | |

AIR CONDITIONED CUSHION PART FOR A VEHICLE SEAT

The present invention relates to a cushion part for a lower seat part and/or a backrest of a vehicle seat which is air-conditioned, in particular passively, having an elastic, air-permeable cushion base part and an air- and water-vapor-permeable air-conditioning layer arranged flat on the base part.

WO99/50090 describes a seat cushion part of this type, the base part comprising a core part foamed as a single piece from plastic. For air-conditioning comfort, the core part has holes which extend completely through the core part and are therefore open at the edge on both sides. The continuous holes permit an effective exchange of air and moisture through the core part, specifically also without active means, such as ventilators or the like. This is therefore a purely passive air-conditioning system. An outer layer is arranged on the core part and is intended, firstly, to enable the seat pressure to be distributed and, secondly, to enable moisture to be transported through the holes of the core part. For this purpose, the outer layer is to consist of a material which can rapidly absorb moisture and can also release it again. Although this known seat cushion is already well-established, a further improvement in the air-conditioning and also mechanical properties is sought.

The present invention is therefore based on the object of providing a cushion part of the type mentioned, with which both the air-conditioning properties and the mechanical properties for supporting and distributing the seat pressure can be optimized at the same time with simple and cost-effective means.

According to the invention, this is achieved by the air-conditioning layer comprising at least two sublayers, specifically a lower layer facing the base part and an upper layer lying on the lower layer. This enables optimum mechanical and also air-conditioning properties to be obtained by virtually any desired and suitable material combination of the two sublayers.

For this purpose, advantageous refinement features and embodiments are contained in the subclaims and in the following description.

The invention will be explained in greater detail with reference to a number of preferred exemplary embodiments and certain design variants which are illustrated in the drawing, in which:

FIG. 3 shows a number of views of subsections of the (3a–3d) cushion part in the region of a hole in a base part, in various refinement variants of the hole.

Figure 11:
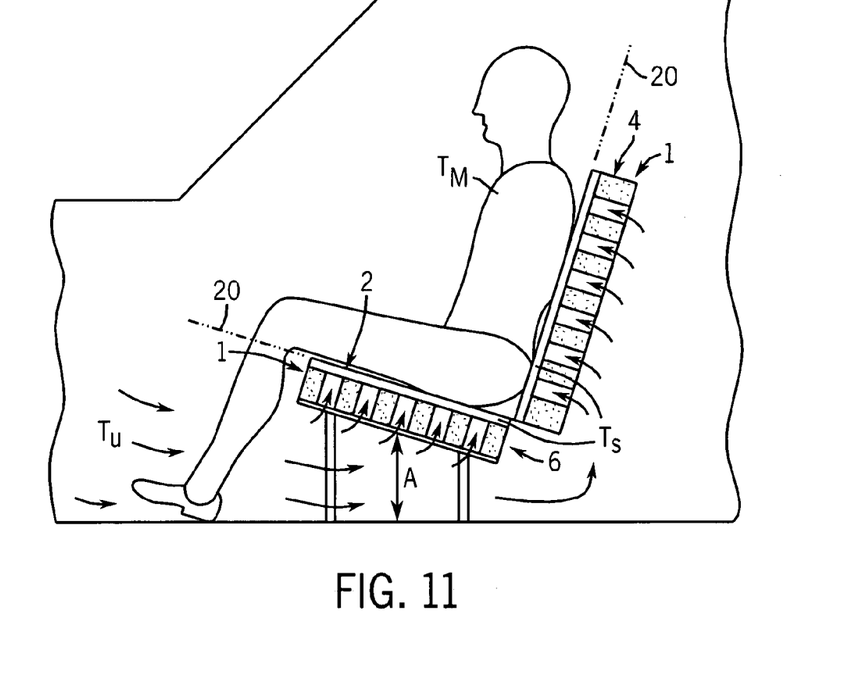
FIG. 11 shows a highly schematic side view, which is sectioned in the seat region, of the situation in which a vehicle seat is installed in a vehicle and has a person sitting on it.

A cushion part 1 according to the invention is conceived for the region of a lower seat part 2 and/or a backrest 4 of a vehicle seat 6 which is preferably air-conditioned purely passively (cf. in particular FIG. 11 in this respect). The cushion part 1 comprises an elastic, air- and moisture-permeable cushion base part 8 and an air-conditioning layer 10 arranged flat on the base part 8. The air-conditioning layer 10 is likewise readily air-permeable, but is advantageously also moisture-permeable (high air and water-vapor permeability) and/or absorbs moisture. This means that the air-conditioning layer 10 can readily absorb moisture (water vapor) and can also release it again rapidly. The air-conditioning layer 10 has a high fatigue strength with a loss in thickness <15%.

According to FIGS. 4 and 7 to 9, the base part 8 and the air-conditioning layer 10 are jointly covered by a covering material 12, said material preferably being an outer textile fabric. In this case, the covering material or the outer fabric 12 has high air and water-vapor permeability at least in the actual seat surface region, the "sitting area". This expediently applies at least to the entire surface region of the covering material 12 that covers the air-conditioning layer 10. The material here is preferably unlaminated; outside this region, the material may be laminated on its side facing the cushion part. The lamination of the outer fabric results in a severe reduction in the permeability of the covering material 12. However, this can be prevented here by sewing it directly, in particular, to the air-conditioning layer 10. The outer textile fabric can be designed as a circular knit, flat woven fabric, raised warp knitted fabric or raised warp circular knit fabric or Jacquard and has an air permeability of more than 450 l/m$^2$/s (according to ISO 9237). It may also be a hydrophilized, in particular moisture-absorbing textile material and/or may have a wool content of up to a maximum of 45%. In addition, the covering material 12 or the outer textile fabric having essentially the abovementioned features can be covered, at least in some regions, by a foam, in particular a PU foam, having a thickness in the range of 2 to 10 mm and a compression hardness of 4 to 6 kPa.

According to the invention, the air-conditioning layer 10 comprises at least two sublayers, specifically a lower layer 14 facing the base part 8 and an upper layer 16 lying on the lower layer 14. These sublayers 14, 16 can advantageously consist of any desired materials, in particular different materials.

The upper layer 16 preferably consists of a moisture-absorbing (water-vapor absorbent) material. For this purpose, the upper layer 16 can contain—at least proportionally—a nonwoven, a hydrophilized textile material, "rubberized hair" (known per se) and/or, in particular, activated carbon. For this purpose, the upper layer 16 can advantageously consist of a base material, in particular a foamed plastic, with activated carbon placed in it, in particular in particle form. The base material can additionally be needle-punched with a nonwoven, which reduces the hardness of this foam/activated carbon layer to an extent suitable for a seat cushion part. Furthermore, the hardness or "softness" may also be set via the volume (the thickness) of the nonwoven material, enabling a soft seating behavior to be achieved. The moisture absorption of this upper layer 16 should be approximately 100 g/m².

In addition, the upper layer 16 is advantageously a relatively soft material, i.e. a material having a compression hardness of, in particular, approximately 4 to 6 kPa and also a high air permeability, where the air permeability should be greater than 500 l/dm²/min (according to ISO 9237).

The lower layer 14 consists preferably of a soft, slightly compressed rubberized hair with a relative density in particular approximately in the range of 500 to 800 kg/m³. However, the lower layer 14 may also be a plastic knit with a high compression hardness of, in particular, approximately 10 to 20 kPa. In any case, the lower layer 14 should have a high elastic restoring force and a high air and water-vapor permeability.

Figures 1, 2:
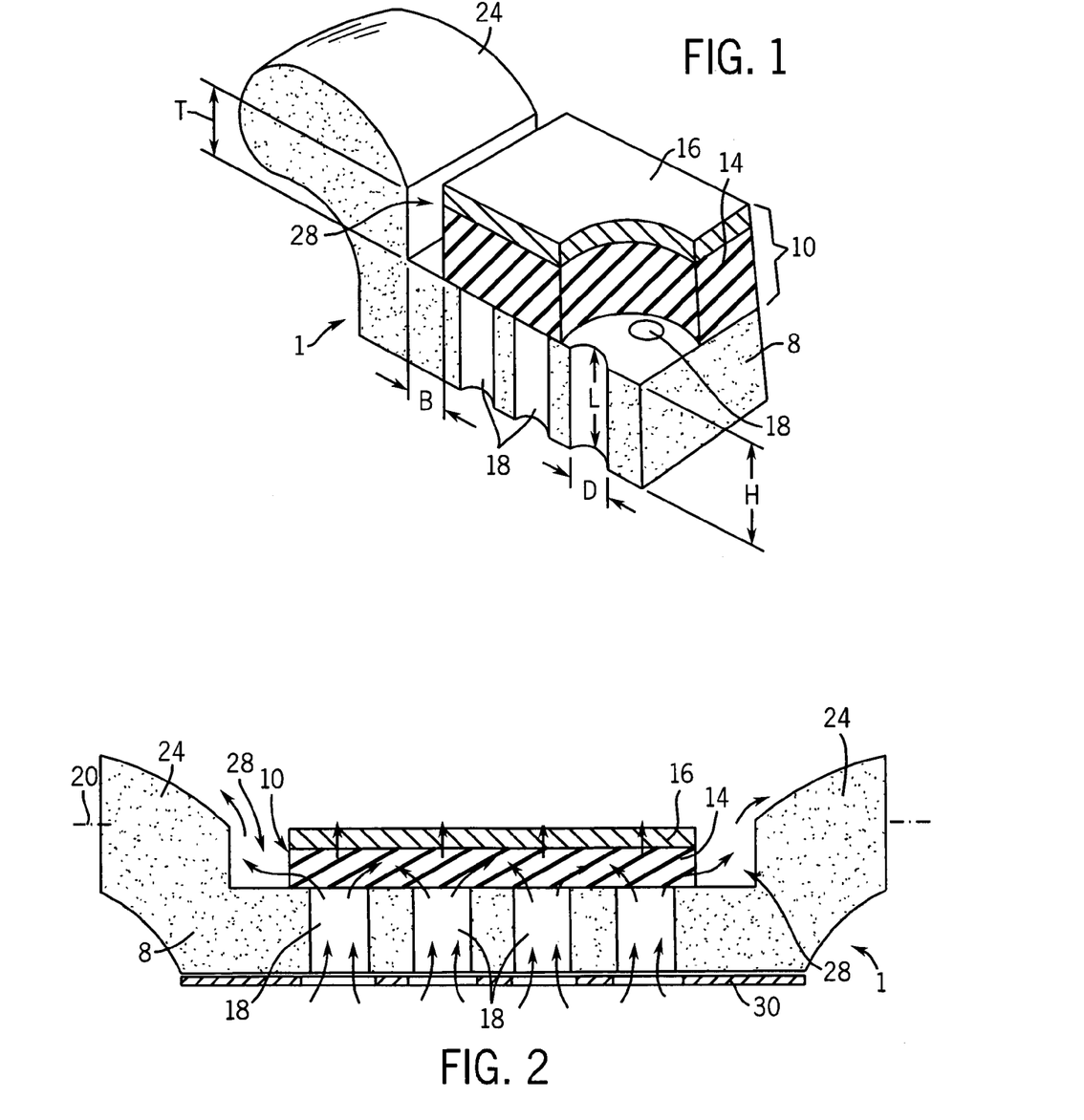
FIG. 1 shows a detail of a cushion part according to the invention in a first embodiment with the essential components.
FIG. 2 shows a schematic overall cross section of the design according to FIG. 1 to illustrate the air-conditioning function.
Figure 3A:
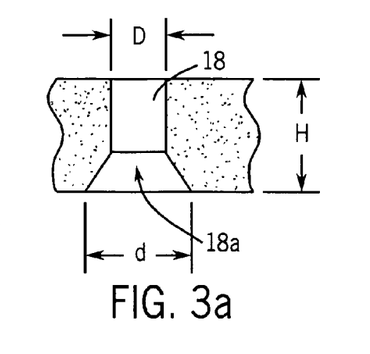
Figure 3B:
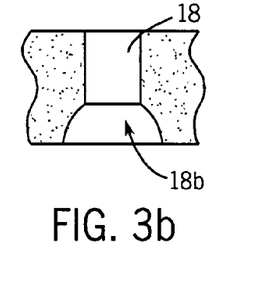
Figure 3C:
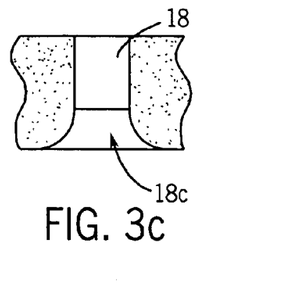
Figure 3D:
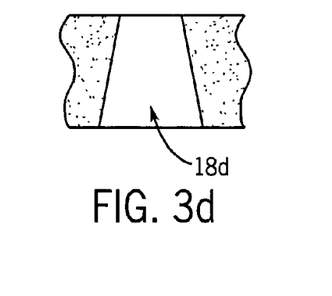

The base part 8 preferably consists of a single-piece foamed-plastic body. In this case, the base part 8 has, for its high air permeability, holes 18 which are distributed over the seat surface and extend continuously through the base part 8 in a direction perpendicular with respect to a main seat plane 20 (cf. FIGS. 2, 4 and 7 to 9). The holes 18 preferably fulfill certain geometrical conditions. The base part 8 has a height H in the surface region of the air-conditioning layer, so that the holes 18 have a length L corresponding to the height H and a hole cross section or diameter D (FIG. 1). In this case, the ratio of hole length L to cross section D should lie in the range of 2:1 to 3:1. At this ratio, the energy of the oscillation amplitude occurring in the vehicle during the journey (excitation via carriageway/moving occupant) is sufficient in order to ensure an exchange of heat and moisture passively i.e. without an additional fan, by a type of pumping action. At different ratios than the ratios mentioned as being preferred, "standing waves" could be formed in the holes 18, as a result of which the exchange of heat and moisture which is sought could be obstructed or even prevented.

As illustrated in FIG. 3, the holes 18 may differ from a continuously cylindrical shape. According to FIG. 3a, the hole 18 has a conical widening 18a adjacent to the lower side of the base part 8 (upper side would also be possible), so that the cross section d on the mouth side of the widening is larger than the cross section D of the cylindrical hole region. The ratio d:D should be approximately 1:1.5. The depth or length of the widening 18a should be approximately ⅓ of the height H of the base part 8. According to FIG. 3b to 3d, other hole contours which have, in particular, a greater cross section on the lower side than in the upper region and the smallest diameter of which should preferably not fall below 20 mm are also possible. Thus, for example, the widening 18b according to FIG. 3b is approximately bell-shaped with a wall which is curved concavely in longitudinal section while the widening 18c according to FIG. 3c has a convexly curved wall. According to FIG. 3d, the hold 18d is of continuously conical design. In all cases, the particular contour of the holes 18 assists the desired transportation of heat and substances (moisture), which results in an improvement in the air-conditioning comfort.

In the preferred embodiments according to FIGS. 5 to 10, an additional intermediate layer 22 of a likewise air-permeable material lies between the base part 8 and the lower layer 14 of the air-conditioning layer 10. Provision is advantageously made here for the lower layer 14 to be of relatively softer design (compression hardness approximately 5 to 15 kPa) and for the intermediate layer 22 to be of relatively harder design (compression hardness approximately 20 to 50 kPa) in such a manner that, when the seat is subjected to a load, a pressing of the lower layer 14 and also of the intermediate layer 22 into the holes 18 of the base part 8—and therefore also an unattractive formation of impressions on the upper seat surface—is avoided. The intermediate layer 22 can advantageously consist of highly compressed rubberized hair with a higher relative density in the range of 600 to 1000 kg/m³, in particular about approximately 1000 kg/m³. As an alternative, it may also be a highly compressed, in particular perforated, nonwoven material. In a further alternative according to FIG. 6, the intermediate layer 22a consists of a plastic plate which is relatively thin, at preferably approximately 1.5 to 4 mm, and is perforated at least in the regions covering the holes 18. The plastic which is used has to satisfy the requirements of the motor vehicle industry, in particular with regard to combustibility (should be hardly inflammable), recycling etc. The intermediate layer 22 or 22a therefore generally has the task of producing sufficient flexural rigidity, which should be at least five times greater than that of the base part 8, so that the other layers of the air-conditioning layer 10 cannot press into the holes 18 of the base part 8. This advantageously avoids the risk of impressions forming on the seat surface. In all of the designs, the air permeability of the intermediate layer 22, 22a should not fall below a value of approximately 400 l/m²/s.

Figure 9:
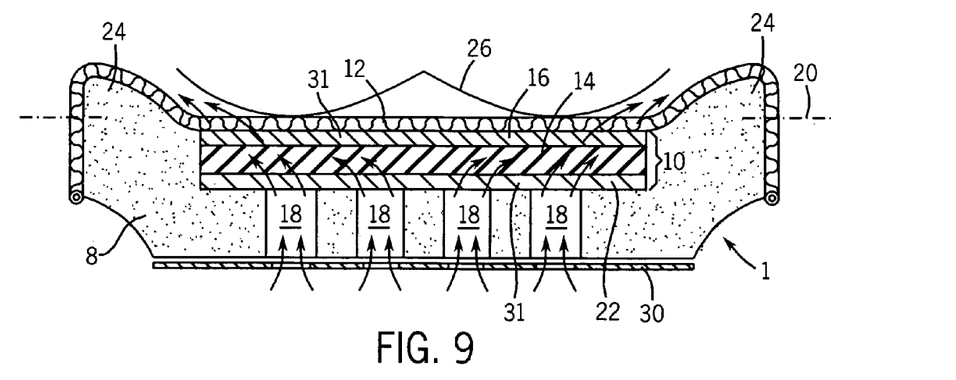
FIG. 9 shows an illustration as in FIG. 7 in one particular refinement.

In the variant illustrated in FIG. 9, both the upper layer 16 and the intermediate layer 22 are formed from a nonwoven material 31. The lower layer 14 lying in between may be—as illustrated—rubberized hair in a single layer, or else, for example, in a number of layers, the rubberized hair having the properties already mentioned and advantageously containing (being impregnated with) activated carbon. The absorption of moisture should be 80 to 150 g/m². The nonwoven material 31, for example in the form of a needle-punched nonwoven or spun-bonded nonwoven, may have an air permeability of 1000 to 2000 l/m²/s and a relative density between 20 and 60 g/m².

In a further advantageous refinement the base part 8 has lateral edge regions 24 which are raised at least approximately to the level of the upper side of the air-conditioning layer 10 and are therefore provided for side support of a person 26 sitting on the seat (cf. FIGS. 4 and 7 to 9). In the designs according to FIGS. 1, 2 and 8, channel-like clearances 28, "tacking channels", are formed between the air-conditioning layer 10 and the edge regions 24 of the base part 8. According to FIG. 1, these clearances 28 have a depth T, which is measured perpendicular with respect to the main seat plane 20, and a width B, where the width B should be at least 3 mm and up to approximately 15 mm in order to ensure that heat and substances (moisture) are conducted away readily. According to FIG. 8, the covering material 12 is pulled downward in the region of the channel-like clearances 28 as far as the bottom of said channels, and is backstitched there, so that the cushion part 11 also has the lateral, channel-like clearances 28 when it is covered. Said clearances are advantageously used at the same time for conducting air while the person 26 is simultaneously optimally supported at the side by the lateral edge regions 24 of the cushion part 1. According to FIG. 8, the air flowing through the holes 18 and the air-conditioning layer 10 can still flow laterally through the channel-like clearances 28 despite the seated person 26.

Figure 4:
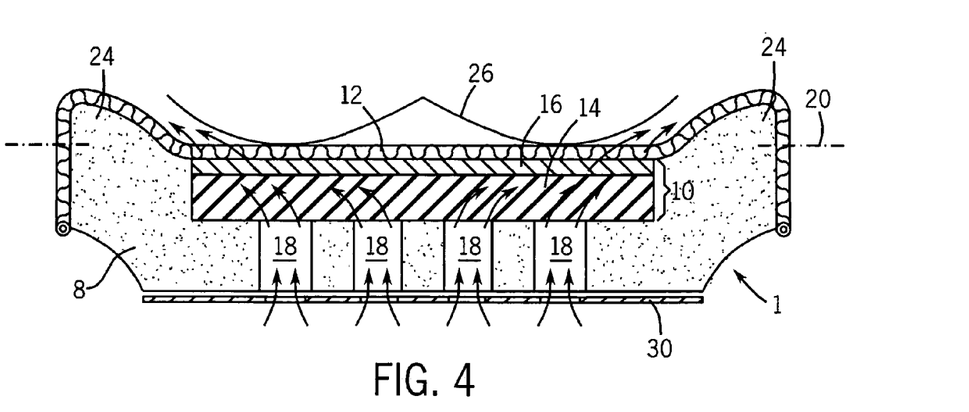
FIG. 4 shows a view similar to FIG. 2 with an additional covering material.
Figure 5:
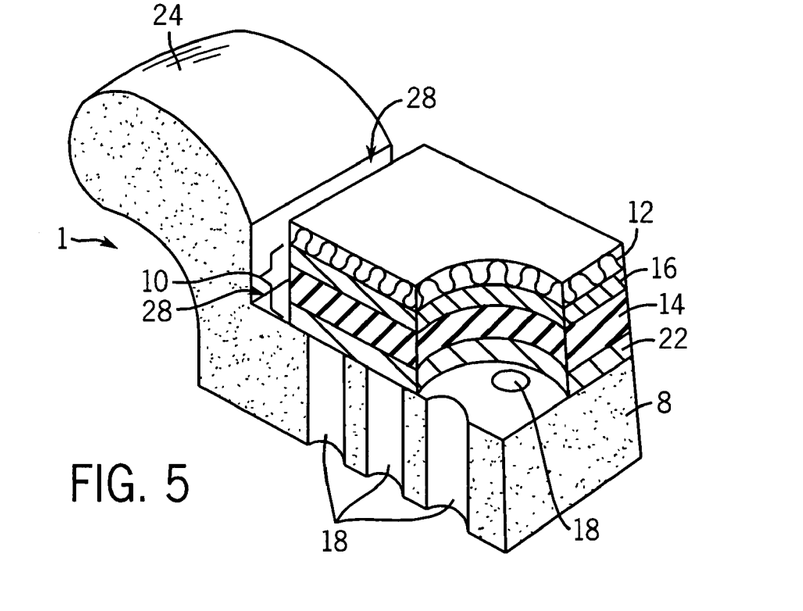
FIG. 5 shows an illustration analogous to FIG. 1 in a second embodiment of the cushion part.
Figure 6:
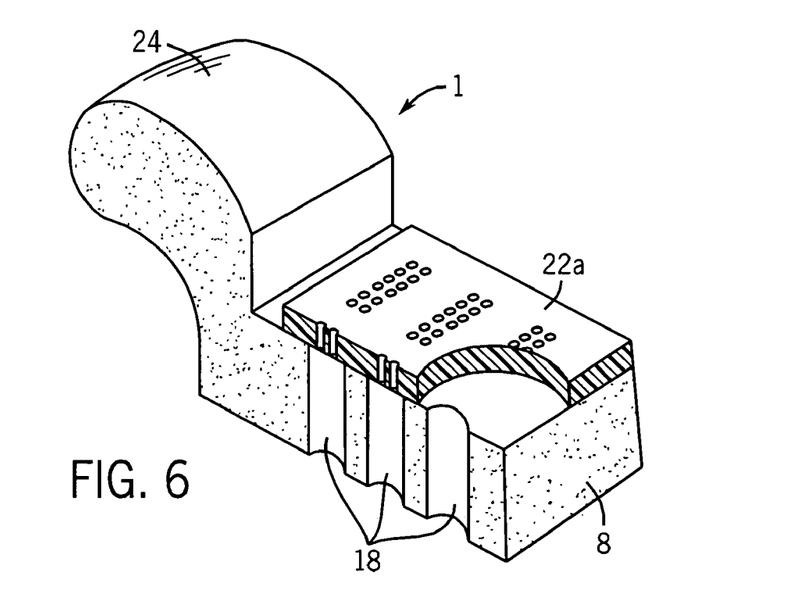
FIG. 6 shows a further illustration analogous to FIG. 1 in a design variant of FIG. 5.
Figure 7:
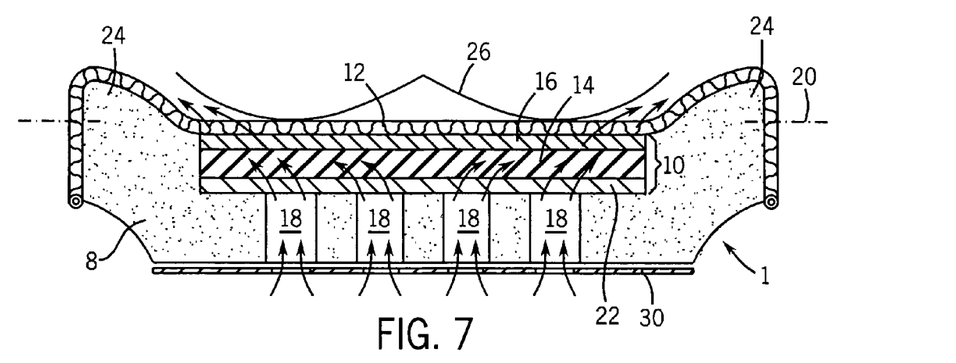
FIG. 7 shows a cross section similar to FIGS. 2 and 4 in another embodiment.
Figure 8:
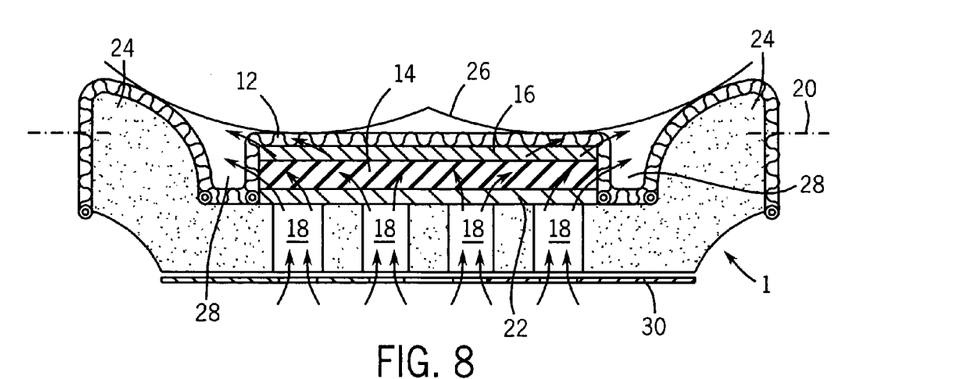
FIG. 8 shows an alternative refinement to FIG. 7 in a corresponding illustration.

The alteratives illustrated in FIGS. 4, 7 and 9 are designed with less side support, in which case the clearances 28 which are recessed in a channel-like manner are dispensed with flow. Instead., passages are formed between the person 26 and the lateral edge regions 24. In this case, the air-conditioning layer 10 lies essentially flush in a corresponding receiving depression of the base part 8.

As is also revealed in FIGS. 2, 4, and 7 to 9, the cushion base part 8; preferably lies flat on a supporting seat structure 30 which is formed, for example, from a seat trough of sheet metal or plastic. For the air-conditioning which is sought, the seat structure is likewise of air-permeable, in particular perforated, design. This air-permeable seat structure 30 may also be formed by metal springs (sinusoidal springs or Pulmaflex underspringing arrangements) which are customary in motor vehicle seats.

Figure 10:
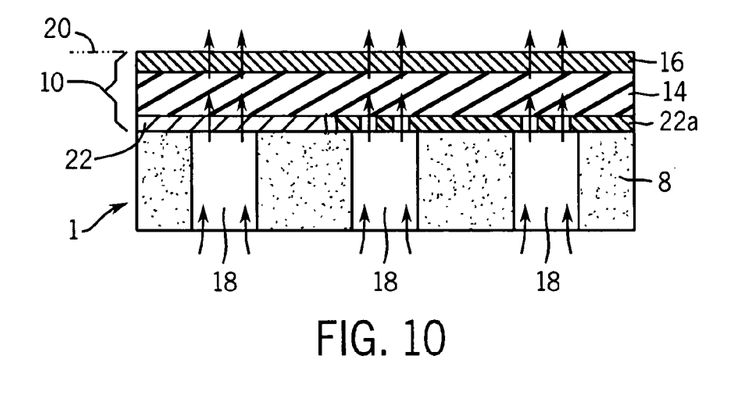
FIG. 10 shows a partial cross section through a cushion part according to the invention in a further design variant.

In the design which is illustrated in FIG. 10, the lower layer 14 lying on the intermediate layer 22 or 22a is a knit made from plastic. This knit is distinguished by a very good restoring force and very good air and water-vapor permeability. Since this knit has a high compression hardness in particular in the range of 10 to 20 kPa, the upper layer 16 lying on it can be of softer design with a compression hardness of, in particular, 4 to 6 kPa.

It should also be mentioned that, in all of the cases in which "rubberized hair" is used, bonded natural fibers (for example animal hairs) but also synthetically produced spacer knits with a corresponding compression hardness and air throughput can be used.

With reference to FIG. 11, the invention is explained in conjunction with the climatic conditions in a vehicle interior.

1. Load Situation in Summer (Vehicle Heated Up):

The ambient temperature $T_U$ in the vehicle interior is lowered very rapidly, in particular by using an air-conditioning system, or is lowered somewhat more slowly by opening the windows. Therefore, $T_U$ is then lower than the temperature $T_M$ of the human body and the temperature $T_S$ in the seat surface region. The heat capacity of the seat means that the temperature of the seat $T_S$ is greater than the body temperature $T_M$ (absorption of radiant energy on the seat). If $T_S$ is greater than $T_M$, a build-up of heat occurs. According to the invention, the cooler temperature $T_U$ can now reach the person more rapidly owing to the holes 18. In this connection, the distance A between the vehicle floor and the seat is also important. When an air-conditioning system is used, the air is additionally dehumidified and the difference in vapor pressure between the seat surface and lower side of the seat becomes greater. Moisture can be transported away from the person.

2. Load Situation in Winter (Vehicle Cooled Down)

The ambient temperature $T_U$ in the vehicle interior is heated by the use of an air-conditioning or heating system. This warm air can then reach the person through the cushion part according to the invention. The power of a seat heating system which is possibly present can therefore advantageously be reduced, or a seat heating system can even be entirely omitted.

The invention is not confined to the exemplary embodiments illustrated and described, but also comprises all designs of equivalent effect within the meaning of the invention. Furthermore, the invention is also not yet confined to the combination of features defined in claim 1 but can also be defined by any other desired combination of particular features of all disclosed individual features. This means that, in principle, virtually any individual feature of claim 1 can be omitted or replaced by at least one individual feature disclosed elsewhere in the application. To this extent, claim 1 is to be understood merely as a first attempt at formulating an invention.

What is claimed is:

1. A cushion part for at least one of a lower seat part and a backrest of a vehicle seat comprising:
    an elastic cushion base part having a thickness;
    a plurality of holes extending through the cushion base part, each of the plurality of holes having a length equal to the thickness of the cushion base part and a diameter that is between approximately one-half and one-third the length of the aperture; and
    an air-permeable air-conditioning layer arranged flat on the base part, the air- conditioning layer including a lower layer facing the base part and an upper layer lying on the lower layer;
    wherein the cushion base part and the air-conditioning layer are configured to passively exchange at least one of heat and moisture.

2. The cushion part of claim 1 wherein the upper layer of the air-conditioning layer includes a moisture-absorbing material.

3. The cushion part of claim 1 wherein the upper layer of the air-conditioning layer includes at least one of a nonwoven material, a hydrophilized textile material, or rubberized hair.

4. The cushion part of claim 1 wherein the upper layer of the air-conditioning layer includes a foam base material.

5. The cushion part of claim 4 further comprising activated carbon within the foam base material.

6. The cushion part of claim 4 wherein the foam base material is needle-punched with a nonwoven material.

7. The cushion part of claim 1 wherein the upper layer of the air-conditioning layer includes a material having a compression hardness ranging from approximately 4 kPa to approximately 6 kPa and an air permeability of at least 500 l/dm$^2$/min.

8. The cushion part of claim 1 wherein the lower layer of the air-conditioning layer includes rubberized hair having a relative density ranging from approximately 500 kg/m$^3$ to approximately 800 kg/m$^3$.

9. The cushion part of claim 1 wherein the lower layer of the air-conditioning layer includes a plastic knit having a compression hardness ranging from approximately 5 kPa to approximately 20 kPa.

10. The cushion part of claim 1 wherein the lower layer of the air-conditioning layer has a high elastic restoring force and a high air and water-vapor permeability.

11. The cushion part of claim 1 wherein the base part has a main seat plane and a seat surface and wherein the plurality of holes are distributed over the seat surface and extend continuously through the base part in a direction perpendicular with respect to the main seat plane.

12. The cushion part of claim 11, further comprising an air-permeable intermediate layer located between the base part and the lower layer.

13. The cushion part of claim 12, wherein the lower layer is softer than the intermediate layer and the intermediate layer is hard enough to prevent the lower layer and the intermediate layer from being pressed into the plurality of holes of the base part when the vehicle seat is subjected to a load.

14. The cushion part of claim 13, wherein the lower layer has a compression hardness ranging from approximately 5 kPa to approximately 15 kPa.

15. The cushion part of claim 13, wherein the intermediate layer has a compression hardness ranging from approximately 20 kPa to approximately 50 kPa.

16. The cushion part of claim 12, wherein the intermediate layer includes rubberized hair having a relative density ranging from approximately 600 kg/m$^3$ to approximately 1000 kg/m$^3$.

17. The cushion part of claim 12, wherein the intermediate layer includes a highly compressed and perforated non-woven material.

18. The cushion part of claim 12, wherein the intermediate layer includes a perforated plastic plate.

19. The cushion part of claim 1 wherein the base part includes a single-piece foamed-plastic body.

20. The cushion part of claim 1, wherein the air-conditioning layer has a lower side adjacent to the base part and an upper side opposite the lower side and wherein the base part includes edge regions raised at least to approximately the level of the upper side of the air-conditioning layer.

21. The cushion part of claim 20, wherein channel-like clearances are formed between the air-conditioning layer and the edge regions of the base part.

22. The cushion part of claim 1, further comprising an air-permeable supporting seat structure.

23. The cushion part of claim 22, wherein the base part lies flat on the supporting seat structure.

24. The cushion part of claim 1, further comprising a covering material covering the air-conditioning layer and the base part, at least a portion of the covering material having high air and water-vapor permeability.

25. The cushion part of claim 24, wherein the at least a portion of the covering material has an air permeability of more that 450 l/m$^2$/s.

26. A cushion part for at least one of a lower seat part and a backrest of a vehicle seat comprising:
   an elastic cushion base part having a seat surface and including at least five holes distributed substantially evenly over the seat surface, the at least five holes extending through the cushion base part; and
   an air-permeable air-conditioning layer arranged flat on the base part, the air-conditioning layer including a lower layer facing the base part and an upper layer lying on the lower layer;
   wherein the at least five holes are configured to allow for the exchange of at least one of heat and moisture in the absence of a fan, by way of excitation from the movement of an occupant on the cushion part of the vehicle seat.

27. The cushion part of claim 1, wherein the upper layer of the air- conditioning layer comprises activated carbon.

28. The cushion part of claim 27, wherein the activated carbon is in particle form.

29. A cushion part for at least one of a lower seat part and a backrest of a vehicle seat comprising:
   an elastic cushion base part having a seat surface and including at least five holes distributed substantially evenly over the seat surface, the at least five holes extending through the cushion base part; and
   an air-permeable air-conditioning layer arranged flat on the base part, the air-conditioning layer including a lower layer facing the base part and an upper layer lying on the lower layer, the upper layer including activated carbon;
   wherein the at least five holes are configured to allow for the exchange of at least one of heat and moisture in the absence of a fan, by way of excitation from the movement of an occupant on the cushion part of the vehicle seat.

* * * * *